(12) United States Patent
Nam et al.

(10) Patent No.: US 12,454,592 B2
(45) Date of Patent: Oct. 28, 2025

(54) GRAFT COPOLYMER, METHOD FOR PREPARING THE SAME, AND RESIN COMPOSITION INCLUDING THE SAME

(71) Applicant: LG CHEM, LTD., Seoul (KR)

(72) Inventors: Sang Il Nam, Daejeon (KR); Ki Hyun Yoo, Daejeon (KR); Yoon Ho Kim, Daejeon (KR); Kwang Jin Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 540 days.

(21) Appl. No.: 17/624,893

(22) PCT Filed: Apr. 19, 2021

(86) PCT No.: PCT/KR2021/004864
§ 371 (c)(1),
(2) Date: Dec. 20, 2022

(87) PCT Pub. No.: WO2021/221367
PCT Pub. Date: Nov. 4, 2021

(65) Prior Publication Data
US 2023/0167217 A1    Jun. 1, 2023

(30) Foreign Application Priority Data

Apr. 29, 2020 (KR) .................. 10-2020-0052725

(51) Int. Cl.
*C08F 279/02* (2006.01)
*C08F 2/24* (2006.01)
(Continued)

(52) U.S. Cl.
CPC .............. *C08F 279/02* (2013.01); *C08F 2/24* (2013.01); *C08F 212/08* (2013.01);
(Continued)

(58) Field of Classification Search
CPC ...... C08L 2201/52; C08L 91/00; C08L 27/06; C08L 51/003; C08L 51/04; C08F 228/02; C08F 236/06
See application file for complete search history.

(56) References Cited

U.S. PATENT DOCUMENTS 4,065,522 A * 12/1977 Myers .................. C08F 279/02
                                                                    525/367
4,191,799 A    3/1980 Gruber
(Continued)

FOREIGN PATENT DOCUMENTS

CN    1190101 A    8/1998
CN    101492519 A   7/2009
(Continued)

OTHER PUBLICATIONS

Extended European Search Report for related European Patent Application No. 21795655.6 dated Jul. 22, 2022, 5 pages.
(Continued)

*Primary Examiner* — Mark S Kaucher
(74) *Attorney, Agent, or Firm* — Morgan, Lewis & Bockius LLP (57) ABSTRACT

Disclosed is a graft copolymer, and a graft copolymer including a rubbery polymer, wherein the rubbery polymer includes a conjugated diene-based monomer unit and a soft domain, the graft copolymer includes an alkyl (meth)acrylate-based monomer unit, an aromatic vinyl-based monomer unit, and an alkali metal sulfonate-based monomer unit, the soft domain is formed by including a mineral-based oil, the mineral-based oil includes 70 wt % to 100 wt % of a mineral oil and 0 wt % to 30 wt % of a silicone-based oil, the mineral-based oil is included in 0.2 parts by weight to 0.5 parts by weight based on 100 parts by weight of the rubbery polymer, and the alkali metal sulfonate-based monomer unit is included in 0.8 wt % to 1.5 wt % based on the graft
(Continued)

copolymer, a method for preparing the same, and a resin composition including the same.

10 Claims, 1 Drawing Sheet

(51) Int. Cl.
    *C08F 212/08*     (2006.01)
    *C08F 220/14*     (2006.01)
    *C08F 220/18*     (2006.01)
    *C08F 228/02*     (2006.01)
    *C08F 236/06*     (2006.01)
    *C08F 285/00*     (2006.01)
    *C08J 3/12*     (2006.01)
    *C08L 91/00*     (2006.01)

(52) U.S. Cl.
    CPC ...... *C08F 220/14* (2013.01); *C08F 220/1802* (2020.02); *C08F 228/02* (2013.01); *C08F 236/06* (2013.01); *C08F 285/00* (2013.01); *C08J 3/12* (2013.01); *C08L 91/00* (2013.01); *C08F 2800/20* (2013.01); *C08J 2351/04* (2013.01); *C08L 2201/52* (2013.01)

(56) References Cited

U.S. PATENT DOCUMENTS

| | | | | |
|---|---|---|---|---|
| 4,384,078 | A | * | 5/1983 | Ohya ............... C08L 51/04 525/77 |
| 6,306,976 | B1 | * | 10/2001 | Matsuda ............ C08F 287/00 525/271 |
| 9,006,330 | B2 | * | 4/2015 | Ahn .................. C08L 51/04 525/70 |
| 2008/0207837 | A1 | | 8/2008 | Weiss et al. |
| 2009/0253828 | A1 | | 10/2009 | Van Den Abbeele |
| 2014/0094556 | A1 | | 4/2014 | Ahn et al. |
| 2020/0270442 | A1 | | 8/2020 | Ok et al. |

FOREIGN PATENT DOCUMENTS

| | | | |
|---|---|---|---|
| CN | 102020749 | A | 4/2011 |
| CN | 103582673 | A | 2/2014 |
| CN | 111065682 | A | 4/2020 |
| JP | S53-33252 | A | 3/1978 |
| JP | S54-69107 | A | 6/1979 |
| JP | 2002-317020 | A | 10/2002 |
| JP | 2007-269848 | A | 10/2007 |
| JP | 2008-535962 | A | 9/2008 |
| JP | 2009-545428 | A | 12/2009 |
| KR | 10-1995-0012097 | B1 | 10/1995 |
| KR | 10-2002-0004216 | A | 1/2002 |
| KR | 10-2006-0042466 | A | 5/2006 |
| KR | 2012-0024231 | A | 3/2012 |
| KR | 2012-0140534 | A | 12/2012 |
| KR | 10-1401109 | B1 | 5/2014 |
| KR | 10-2014-0099350 | A | 8/2014 |
| KR | 10-2018-0077437 | A | 7/2018 |
| KR | 2020-0042558 | A | 4/2020 |

OTHER PUBLICATIONS

International Search Report issued in corresponding International Patent Application No. PCT/KR2021/004864 dated Aug. 3, 2021.
Office Action issued in Chinese application 202180004579.7 dated Jul. 15, 2023.
Office Action issued in corresponding Japanese Patent Application No. 2022-500570, dated Jan. 31, 2023.

* cited by examiner

GRAFT COPOLYMER, METHOD FOR PREPARING THE SAME, AND RESIN COMPOSITION INCLUDING THE SAME

TECHNICAL FIELD

Cross-Reference to Related Applications

The present application claims the benefit of priority based on Korean Patent Application No. 10-2020-0052725, filed on Apr. 29, 2020, the entire contents of which are incorporated herein by reference.

Technical Field

The present invention relates to a graft copolymer, and to a graft copolymer having excellent whitening properties as an impact reinforcing agent with respect to a vinyl chloride resin, reinforcing entanglement with a vinyl chloride resin to minimize the deformation of a product, and having excellent strength and heat resistance, a method for preparing the same, and a resin composition including the same.

BACKGROUND ART

Vinyl chloride-based resins are cheap, are easy to control hardness, have various application fields, have excellent physical properties and chemical properties, and are widely used in various fields. However, the vinyl chloride-based resins themselves have structurally inferior impact resistance, processing liquidity, heat resistant deformation, etc., and for commercialization, the use of additives for supplementing the defects of the vinyl chloride-based resins is essential, and among the additives, an impact reinforcing agent is necessary.

As the impact reinforcing agent available in the vinyl chloride-based resins, a thermoplastic polymer-based impact reinforcing agent such as an methylmethacrylate-butadiene-styrene (MBS)-based impact reinforcing agent, an acrylic impact reinforcing agent, chlorinated polyethylene (CPE), and ethylene vinyl acetate (EVA); and an inorganic impact reinforcing agent such as calcium carbonate coated with stearic acid, may be used, and among them, the MBS-based impact reinforcing agent and the acrylic impact reinforcing agent are mostly used.

Recently, a butadiene-based impact reinforcing agent is mostly used for the usage of interior, deco sheets, and flooring materials of building structures, and according to the purpose of use, dispersibility during processing, adhesion in a roll mill, and thermal stability are required as well as impact strength.

Particularly, in the case where a refractive index is controlled with a vinyl chloride-based resin, the MBS-based impact reinforcing agent may be used in transparent products such as toy packaging, and has advantages of using in opaque products such as a credit card by increasing the content of butadiene. However, recently, due to the whitening phenomenon by the impact reinforcing agent, there have been calls for reducing the content of the impact reinforcing agent, and accordingly, efforts to secure the impact strength, while improving the whitening phenomenon by the impact reinforcing agent are continuing.

However, since the MBS-based reinforcing agent has the trade off relation between impact strength and whitening properties, the improvement of the impact strength and the whitening properties at once is difficult. Accordingly, a method of introducing a silicone-based oil used in the preparation process of acrylonitrile-butadiene-styrene (ABS) during preparing an MBS-based impact reinforcing agent has been suggested. The silicone-based oil forms a soft domain in a butadiene rubber and may improve impact strength, and accordingly, if applied to a vinyl chloride-based resin, impact strength may increase. However, at the same time, there are problems in that whitening phenomenon rapidly rises, and the application thereof becomes impossible.

PRIOR ART DOCUMENT

Patent Document (Patent Document 1) KR10-2006-0042466A

DISCLOSURE OF THE INVENTION

Technical Problem

The present invention has been made to solve the above-described problems of the conventional technique, and has an object of improving impact strength, while maintaining whitening properties to equal or better levels, when a graft copolymer is applied to a vinyl chloride-based resin as an impact reinforcing agent.

In addition, another object of the present invention is to reinforcing entanglement between a vinyl chloride-based resin and a graft copolymer, reducing energy from external stress, and minimizing the deformation of a molded article, when a graft copolymer is applied to a vinyl chloride-based resin as an impact reinforcing agent.

Technical Solution

In order to solve the above-described tasks, the present invention provides a graft copolymer including a rubbery polymer, wherein the rubbery polymer includes a conjugated diene-based monomer unit, and a soft domain, the graft copolymer includes an alkyl (meth)acrylate-based monomer unit, an aromatic vinyl-based monomer unit, and an alkali metal sulfonate-based monomer unit, the soft domain is formed by including a mineral-based oil, the mineral-based oil includes 70 wt % to 100 wt % of a mineral oil and 0 wt % to 30 wt % of a silicone-based oil, the mineral-based oil is included in 0.2 parts by weight to 0.5 parts by weight based on 100 parts by weight of the rubbery polymer, and the alkali metal sulfonate-based monomer unit is included in 0.8 wt % to 1.5 wt % based on the graft copolymer.

In addition, the present invention provides a method for preparing a graft copolymer including: injecting and polymerizing a conjugated diene-based monomer and a mineral-based oil to prepare a rubbery polymer latex including a rubbery polymer (S10); injecting an alkyl (meth)acrylate-based monomer and an alkali metal sulfonate-based monomer in the presence of the rubbery polymer latex prepared in step (S10), and graft polymerizing to prepare a graft copolymer latex including a graft copolymer (S20); and injecting an aromatic vinyl-based monomer in the presence of the graft copolymer latex prepared in step (S20) and subsequently graft polymerizing (S30), wherein the mineral-based oil includes 70 wt % to 100 wt % of a mineral oil and 0 wt % to 30 wt % of a silicone-based oil, the mineral-based oil is injected in an amount from 0.2 parts by weight to 0.5 parts by weight based on 100 parts by weight of the conjugated diene-based monomer, and the alkali metal sulfonate-based monomer is injected in an amount from 0.8 wt % to 1.5 wt % based on the rubbery polymer and a total monomer amount injected.

In addition, the present invention provides a resin composition including the graft copolymer, and a vinyl chloride-based resin.

Advantageous Effects

In case of applying the graft copolymer of the present invention in a vinyl chloride-based resin as an impact reinforcing agent, improving effects may be achieved, while maintaining the whitening properties of a resin composition to equal or better levels.

In addition, in case of applying the graft copolymer of the present invention in a vinyl chloride-based resin as an impact reinforcing agent, entanglement between the vinyl chloride-based resin and the graft copolymer may be reinforced, energy from external stress may be reduced, and effects of minimizing the deformation of a molded article may be achieved.

In addition, the resin composition of the present invention includes the graft copolymer, and whitening properties may be maintained to equal or better levels, and effects of excellent impact strength and minimizing the deformation of a molded article may be achieved.

BEST MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

The term "monomer unit" in the present invention may represent a component or a structure derived from the monomer or the material itself, in a particular embodiment, may mean a repeating unit formed in the polymer during polymerizing a polymer through the participation of the monomer injected in polymerization reaction.

The term "composition" used in the present invention includes a reaction product and a decomposition product formed from the materials of a corresponding composition as well as a mixture of materials including the corresponding composition.

The present invention provides a graft copolymer which may be used as an impact reinforcing agent. The graft copolymer is a graft copolymer including a rubbery polymer, wherein the rubbery polymer includes a conjugated diene-based monomer unit, and a soft domain, the graft copolymer includes an alkyl (meth)acrylate-based monomer unit, an aromatic vinyl-based monomer unit, and an alkali metal sulfonate-based monomer unit, the soft domain is formed by including a mineral-based oil, the mineral-based oil includes 70 wt % to 100 wt % of a mineral oil and 0 wt % to 30 wt % of a silicone-based oil, the mineral-based oil is included in 0.2 parts by weight to 0.5 parts by weight based on 100 parts by weight of the rubbery polymer, and the alkali metal sulfonate-based monomer unit is included in 0.8 wt % to 1.5 wt % based on the graft copolymer.

According to an embodiment of the present invention, the mineral-based oil may be included in 0.2 parts by weight to 0.5 parts by weight, 0.2 parts by weight to 0.4 parts by weight, 0.3 parts by weight to 0.5 parts by weight, or 0.3 parts by weight to 0.4 parts by weight based on 100 parts by weight of the rubbery polymer. If the mineral-based oil is included in less than 0.2 parts by weight, the soft domain may be insufficiently formed in the rubbery polymer, and impact strength may be degraded, and if the mineral-based oil is included in greater than 0.5 parts by weight, and if the silicone-based oil is included together, there are problems in that the absolute amount of the silicone-based oil increases, and whitening properties are degraded.

In addition, according to an embodiment of the present invention, the mineral-based oil may include 70 wt % to 100 wt % of a mineral oil and 0 wt % to 30 wt % of a silicone-based oil, 70 wt % to 90 wt % of a mineral oil and 10 wt % to 30 wt % of a silicone-based oil, or 70 wt % to 80 wt % of a mineral oil and 20 wt % to 30 wt % of a silicone-based oil. If the silicone-based oil is included in the mineral-based oil in greater than 30 wt %, there are problems in that the absolute amount of the silicone-based oil increases, and whitening properties are degraded.

According to an embodiment of the present invention, the mineral oil may include a hydrocarbon of less than 20 carbon atoms, in a particular embodiment, a mixture of alkane of less than 20 carbon atoms, which is present in a liquid state at room temperature, and may include paraffin according to circumstances. The mineral oil may be a colorless, odorless oil extracted from petroleum. The mineral oil may have a commercially available viscosity of 100 cs to 1,000 cs.

According to an embodiment of the present invention, the silicone-based oil may be polydimethylsiloxane. In a particular embodiment, the silicone-based oil may be a polydimethylsiloxane oil having a commercially available kinetic viscosity of 100 cs to 1,000 cs.

According to an embodiment of the present invention, the conjugated diene-based monomer unit is for providing a graft copolymer with impact resistance, and a conjugated diene-based monomer forming the conjugated diene-based monomer unit may be one or more selected from the group consisting of 1,3-butadiene, 2,3-dimehtyl-1,3-butadiene, piperylene, 3-butyl-1,3-octadiene, isoprene and 2-phenyl-1,3-butadiene, particularly, 1,3-butadiene.

According to an embodiment of the present invention, the rubbery polymer may include an aromatic vinyl-based monomer unit. The aromatic vinyl-based monomer unit is for providing a graft copolymer with transparency, and an aromatic vinyl-based monomer forming the aromatic vinyl-based monomer unit may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, particularly, styrene.

According to an embodiment of the present invention, if the rubbery polymer includes the aromatic vinyl-based monomer unit, the conjugated diene-based monomer unit may be 60 wt % to 90 wt %, 65 wt % to 80 wt %, or 70 wt % to 75 wt % based on the rubbery polymer, and within this range, effects of excellent impact strength may be obtained. In addition, if the rubbery polymer includes the aromatic vinyl-based monomer unit, the aromatic vinyl-based monomer unit may be 10 wt % to 40 wt %, 20 wt % to 35 wt %, or 25 wt % to 30 wt % based on the rubbery polymer, and within this range, transparency is excellent, and effects of controlling refractive index according to a vinyl chloride-based resin may be obtained.

According to an embodiment of the present invention, the amount of the rubbery polymer may be 50 wt % to 90 wt %, 60 wt % to 80 wt %, or 65 wt % to 70 wt % based on the graft copolymer, and within this range, effects of the improving impact strength may be achieved, while maintaining whitening properties of a resin composition including the graft copolymer as an impact reinforcing agent to equal or better levels.

According to an embodiment of the present invention, the average particle diameter of the rubbery polymer may be 180 nm to 220m nm, 185 nm to 215 nm, or 190 nm to 210 nm, and within this range, effects of improving impact strength may be achieved, while maintaining whitening properties of a resin composition including the graft copolymer as an impact reinforcing agent to equal or better levels.

According to an embodiment of the present invention, the alkyl (meth)acrylate-based monomer unit is for providing a graft copolymer with transparency and improving compatibility with a vinyl chloride-based resin, and an alkyl (meth) acrylate-based monomer forming the alkyl (meth)acrylate-based monomer unit may be an alkyl (meth)acrylate-based monomer of 1 to 12 carbon atoms, and in a particular embodiment, a mixture of a methyl (meth)acrylate monomer; and one or more monomers selected from the group consisting of alkyl (meth)acrylate monomers of 2 to 12 carbon atoms, more particularly, a mixture of a methyl methacrylate; and one or more selected from the group consisting of alkyl acrylates of 2 to 12 carbon atoms.

According to an embodiment of the present invention, in the case where the alkyl (meth)acrylate-based monomer is the mixture of a methyl (meth)acrylate-based monomer; and one or more monomers selected from the group consisting of alkyl (meth)acrylate-based monomers of 2 to 12 carbon atoms, the weight ratio of the methyl (meth)acrylate-based monomer; and the one or more monomers selected from the group consisting of and alkyl (meth)acrylate-based monomers of 2 to 12 carbon atoms may be 4.6 to 7.5:1, 5 to 7:1, or 5 to 6.4:1, and within this range, the high reactivity of the methyl (meth)acrylate-based monomer may be controlled, and at the same time, the alkyl (meth)acrylate-based monomer unit of 2 to 12 carbon atoms may be formed between the methyl (meth)acrylate-based monomer units, and effects that the graft layer of a graft copolymer shows a uniform molecular weight may be achieved.

According to an embodiment of the present invention, the amount of the alkyl (meth)acrylate-based monomer unit may be 1 wt % to 30 wt %, 5 wt % to 25 wt %, or 10 wt % to 20 wt % based on the graft copolymer, and within this range, effects of excellent transparency and compatibility of the graft copolymer may be achieved.

According to an embodiment of the present invention, the aromatic vinyl-based monomer unit is for providing a graft copolymer with compatibility, and an aromatic vinyl-based monomer forming the aromatic vinyl-based monomer unit may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, particularly, styrene.

According to an embodiment of the present invention, the amount of the aromatic vinyl-based monomer unit may be 1 wt % to 20 wt %, 5 wt % to 15 wt %, or 10 wt % to 15 wt % based on the graft copolymer, and within this range, excellent effects of compatibility of the graft copolymer may be obtained.

According to an embodiment of the present invention, the alkali metal sulfonate-based monomer may be sodium methylallyl sulfonate. Like this, if the graft copolymer includes the alkali metal sulfonate-based monomer unit, the graft copolymer includes ionic bonds present in the alkali metal sulfonate-based monomer, and glass transition temperature may increase, heat resistant properties may be improved, and entanglement between a vinyl chloride-based resin and a graft copolymer may be reinforced. Accordingly, energy from external stress may be reduced, and effects of minimizing the deformation of a molded article may be obtained. In addition, since the ionic bonds may perform the function of a reactive emulsifier, improving effects of the stability of a latex during preparing a graft copolymer may be achieved.

According to an embodiment of the present invention, the amount of the alkali metal sulfonate-based monomer unit may be 0.8 wt % to 1.5 wt %, 0.8 wt % to 1.2 wt %, 1.2 wt % to 1.5 wt %, or 1.0 wt % to 1.4 wt % based on the graft copolymer. If the amount of the alkali metal sulfonate-based monomer unit is less than 0.8 wt %, the weight average molecular weight of the graft layer of the graft copolymer may be insufficiently increased, and the graft layer is insufficiently formed, and dispersibility is deteriorated, and accordingly, there are problems of reducing impact resistance as well as processability. If the amount is greater than 1.5 wt %, during preparing a graft copolymer dry powder, phase separation between a graft copolymer and water is not generated on a latex, and the dry powder could not be prepared.

According to an embodiment of the present invention, in the case where the graft copolymer includes the rubbery polymer, the alkyl (meth)acrylate-based monomer unit, the aromatic vinyl-based monomer unit and the alkali metal sulfonate-based monomer unit, a graft layer including alkyl (meth)acrylate-based monomer unit, aromatic vinyl-based monomer unit and alkali metal sulfonate-based monomer unit grafted into the rubbery polymer may be included.

In addition, according to an embodiment of the present invention, the graft layer may have a weight average molecular weight of 35,000 g/mol to 45,000 g/mol, 36,000 g/mol to 44,000 g/mol, 36,000 g/mol to 39,000 g/mol, or 36,000 g/mol to 38,000 g/mol, and within this range, entanglement between a vinyl chloride-based resin and a graft copolymer may be reinforced, energy from external stress may be reduced, and effects of minimizing the deformation of a molded article may be achieved. In addition, since the ionic bonds may also perform the function of a reactive emulsifier, during preparing a graft copolymer, effects of improving latex stability may be obtained.

In addition, according to an embodiment of the present invention, the average particle diameter of the graft copolymer may be 200 nm to 250 nm, 200 nm to 240 nm, or 210 nm to 230 nm, and within this range, effects of improving impact resistance may be achieved, while maintaining whitening properties of a resin composition including the graft copolymer as an impact reinforcing agent to equal or better levels.

The present invention provides a method for preparing a graft copolymer. The method for preparing the graft copolymer includes: injecting and polymerizing a conjugated diene-based monomer and a mineral-based oil to prepare a rubbery polymer latex including a rubbery polymer (S10); injecting an alkyl (meth)acrylate monomer and an alkali metal sulfonate-based monomer in the presence of the rubbery polymer latex prepared in step (S10) and graft polymerizing to prepare a graft copolymer latex including a graft copolymer (S20); and injecting an aromatic vinyl-based monomer in the presence of the graft copolymer latex prepared in step (S20) and subsequently graft polymerizing (S30), wherein the mineral-based oil includes 70 wt % to 100 wt % of a mineral oil and 0 wt % to 30 wt % of a silicone-based oil, the mineral-based oil is injected in an amount from 0.2 parts by weight to 0.5 parts by weight based on 100 parts by weight of the conjugated diene-based monomer, and the alkali metal sulfonate-based monomer is injected in an amount from 0.8 wt % to 1.5 wt % based on the rubbery polymer and a total monomer amount injected.

According to an embodiment of the present invention, step (S10) is a step for preparing a rubbery polymer and may be a step of polymerizing a conjugated diene-based monomer. Here, the conjugated diene-based monomer may be the same as the monomer for forming the conjugated diene-based monomer unit and the aromatic vinyl-based monomer unit of the above-described rubbery polymer. In addition, the conjugated diene-based monomer may be injected in the same amount as the above-described amount of the conjugated diene-based monomer unit of the rubbery polymer.

According to an embodiment of the present invention, step (S10) may be performed by emulsion polymerization, and accordingly, the rubbery polymer may be obtained in a rubbery polymer latex type including the rubbery polymer.

According to an embodiment of the present invention, step (S10) may be performed by radical polymerization using a peroxide-based, redox, or azo-based initiator, and the redox initiator may be, for example, one or more selected from the group consisting of t-butyl hydroperoxide, diisopropylbenzene hydroperoxide and cumene hydroperoxide. In this case, effects of providing stable polymerization environment may be obtained.

In addition, according to an embodiment of the present invention, in case of using the redox initiator, ferrous sulfate, sodium ethylenediaminetetraacetate and sodium formaldehyde sulfoxylate may be further included as the redox catalyst.

In addition, according to an embodiment of the present invention, an emulsifier used for emulsion polymerization in step (S10) may be one or more selected from the group consisting of an anionic emulsifier, a cationic emulsifier and a nonionic emulsifier, and particular embodiments may include one or more selected from the group consisting of alkylaryl sulfonate, alkali methyl alkylsulfate, a soap of fatty acid, an oleic acid alkali salt, a rosin acid alkali salt, a lauryl acid alkali salt, sodium diethylhexyl phosphate, a phosphonated polyoxyethylene alcohol and phosphonated polyoxyethylene phenol, and in this case, effects of providing stable polymerization environment may be obtained. The emulsifier may be injected in an amount from, for example, 5.0 parts by weight or less, 3.0 parts by weight or less, or 0.5 parts by weight to 2.5 parts by weight based on 100 parts by weight of the total amount of the monomers injected in step (S10).

According to an embodiment of the present invention, the emulsion polymerization in step (S10) may be performed in an aqueous solvent, and the aqueous solvent may be ion exchange water.

In addition, according to an embodiment of the present invention, step (S10) may be performed by further including an aromatic vinyl-based monomer. Here, the aromatic vinyl-based monomer may be the same as the monomer for forming the aromatic vinyl-based monomer unit of the rubbery polymer described above. In addition, the aromatic vinyl-based monomer may be injected in the same amount as that of the aromatic vinyl-based monomer unit of the rubbery polymer described above.

According to an embodiment of the present invention, the emulsion polymerization in step (S10) may be performed by injecting a mineral-based oil together with the conjugated diene-based monomer. In this case, the mineral-based oil may form a soft domain between chains formed by the conjugated diene-based monomer units in the rubbery polymer during forming the rubbery polymer by the polymerization of the conjugated diene-based monomer. Here, the mineral-based oil may be the same as the above-described mineral-based oil. In addition, the mineral-based oil may be injected in the same amount as the amount of the above-described mineral-based oil of the rubbery polymer.

According to an embodiment of the present invention, step (S20) is a step for preparing a graft copolymer, and may be a step for graft polymerizing an alkyl (meth)acrylate-based monomer and an alkali metal sulfonate-based monomer. Here, the alkyl (meth)acrylate-based monomer may be the same as the above-described monomer for forming the alkyl (meth)acrylate-based monomer unit of the graft copolymer. In addition, the alkyl (meth)acrylate-based monomer may be injected in the same amount as the above-described amount of the alkyl (meth)acrylate-based monomer unit of the graft copolymer. In addition, here, the alkali metal sulfonate-based monomer may be the same as the above-described monomer for forming the alkali metal sulfonate-based monomer unit of the graft copolymer. In addition, the alkali metal sulfonate-based monomer may be injected in the same amount as the above-described amount of the alkali metal sulfonate-based monomer unit of the graft copolymer.

In addition, according to an embodiment of the present invention, the preparation method of the graft copolymer may include injecting an aromatic vinyl-based monomer in the presence of the graft copolymer latex prepared in step (S20) and secondly graft polymerizing (S30).

According to an embodiment of the present invention, step (S30) may be performed by injecting an aromatic vinyl-based monomer in an incre injection method, and accordingly, a molecular weight may be controlled small, and the aromatic vinyl-based monomers enter between graft layers formed from the alkyl (meth)acrylate-based monomer and the alkali metal sulfonate-based monomer to achieve a stable state from an unstable state of the alkyl (meth)acrylate monomer, and thus, the stability of a latex is improved, and at the same time, effects of improving whitening properties may be obtained. Here, the aromatic vinyl-based monomer may be the same as the monomer for forming the above-described aromatic vinyl-based monomer unit of the graft copolymer. In addition, the aromatic vinyl-based monomer may be injected in the same amount as the amount of the above-described aromatic vinyl-based monomer unit of the graft copolymer.

According to an embodiment of the present invention, the graft polymerization in step (S20) and step (S30) may be performed by emulsion polymerization, and accordingly, the graft copolymer may be obtained in a graft copolymer latex type including the graft copolymer.

According to an embodiment of the present invention, the graft polymerization in step (S20) and step (S30) may be performed by radical polymerization using a peroxide-based, redox, or azo-based initiator, and the redox initiator may be, for example, one or more selected from the group consisting of t-butyl hydroperoxide, diisopropylbenzene hydroperoxide and cumene hydroperoxide. In this case, effects of providing stable polymerization environment may be obtained.

In addition, according to an embodiment of the present invention, in case of using the redox initiator, ferrous sulfate, sodium ethylenediaminetetraacetate and sodium formaldehyde sulfoxylate may be further included as the redox catalyst.

In addition, according to an embodiment of the present invention, the graft polymerization in step (S20) and step (S30) may be performed without injecting an emulsifier. In a particular embodiment, since the alkali metal sulfonate-based monomer injected in step (S20) shows ionic characteristics by itself and may play the role of a reactive emulsifier as a monomer, simultaneously, and accordingly, the graft polymerization may be performed without injecting an extra emulsifier.

According to an embodiment of the present invention, the graft polymerization in step (S20) and step (S30) may be performed in an aqueous solvent, and the aqueous solvent may be ion exchange water.

In addition, the present invention provides a resin composition including the graft copolymer and a vinyl chloride-based resin.

According to an embodiment of the present invention, the resin composition may be a vinyl chloride-based resin composition including the graft copolymer as an impact reinforcing agent.

According to an embodiment of the present invention, the resin composition may include the graft copolymer in 1 part by weight to 15 parts by weight, 3 parts by weight to 12 parts by weight, or 5 parts by weight to 10 parts by weight based on 100 parts by weight of the vinyl chloride-based resin.

According to an embodiment of the present invention, the resin composition may include an additive such as an antioxidant, a thermal stabilizer, a plasticizer, a processing aid, a coloring agent, and a lubricant, well-known in the art in a typical amount, as necessary.

Hereinafter, embodiments of the present invention will be explained in detail so that a person skilled in the art could easily perform the present invention. However, the present invention may be accomplished in various other types and is not limited to the embodiments explained herein.

EXAMPLES

Example 1

<Preparation of Rubbery Polymer Latex>

To a 120 L, high-pressure polymerization reactor equipped with a stirrer, based on total 100 parts by weight of 1,3-butadiene, 150 parts by weight of ion exchange water, 1.0 part by weight of sodium sulfate, 2.0 parts by weight of potassium oleate, 0.0047 parts by weight of sodium ethylenediaminetetraacetate, 0.003 parts by weight of ferrous sulfate, 0.02 parts by weight of sodium formaldehyde sulfoxylate and 0.1 parts by weight of diisopropybenzene hydroperoxide were injected. Then, 100 parts by weight of 1,3-butadiene and 0.35 parts by weight of mineral-based oil A (mineral oil:PDMS=80:20 (weight ratio); viscosity range of mineral oil of 100 cs to 1,000 cs, viscosity range of PDMS of 100 cs to 1,000 cs) were injected in batch, and polymerization was performed at 50° C. for 15 hours to prepare a rubbery polymer latex. A final polymerization conversion ratio was 98%, and the average particle diameter of rubbery polymer particles was 200 nm.

The polymerization conversion ratio was calculated as the ratio of the solid content of the rubbery polymer obtained with respect to the solid content of monomer injected.

<Preparation of Graft Copolymer Latex>

To a closed polymerization reactor substituted with nitrogen, based on total 100 parts by weight of a rubbery polymer latex (based on the solid content), methyl methacrylate, ethyl acrylate, sodium methylallyl sulfonate and styrene, 70 parts by weight based on the solid content of the rubbery polymer latex prepared above was injected, 0.0094 parts by weight of sodium ethylenediaminetetraacetate, 0.006 parts by weight of ferrous sulfate, and 0.04 parts by weight of sodium formaldehyde sulfoxylate were injected, 16 parts by weight of methyl methacrylate, 2.8 parts by weight of ethyl acrylate, 0.8 parts by weight of sodium methylallyl sulfonate, and 15 parts by weight of ion exchange water were injected in batch, and polymerization was performed at 50° C. for 1 hour. Then, 10 parts by weight of styrene and 10 parts by weight of ion exchange water were injected in an incre injection method, and polymerization was performed at 50° C. for 1 hour to prepare a graft copolymer latex. A final polymerization conversion ratio was 99%, and the average particle diameter of graft copolymer particles was 210 nm.

The polymerization conversion ratio was calculated as the ratio of the solid content of the graft copolymer obtained with respect to the solid contents of the rubbery polymer and monomer injected.

<Preparation of Graft Copolymer Dry Powder>

To 100 parts by weight (based on the solid content) of the graft copolymer latex thus obtained, 0.8 parts by weight of a mixture of IR 245 antioxidant and dilauryl thiodipropionate (DLTDP) were injected, sulfuric acid and a sodium chloride aqueous solution were injected at 45° C. to agglomerate, the phases of a graft copolymer and water were separated at 85° C., and then, dehydration and drying were conducted to obtain a graft copolymer dry powder.

Example 2

The same method as in Example 1 was performed except for injecting mineral-based oil B (mineral oil:PDMS=70:30 (weight ratio)) instead of the mineral-based oil A (mineral oil:PDMS=80:20 (weight ratio)) in the same amount during preparing the rubbery polymer latex, in Example 1.

Example 3

The same method as in Example 1 was performed except for injecting 0.2 parts by weight of mineral-based oil B (mineral oil:PDMS=70:30 (weight ratio)) instead of 0.35 parts by weight of the mineral-based oil A (mineral oil:PDMS=80:20 (weight ratio)) during preparing the rubbery polymer latex, in Example 1.

Example 4

The same method as in Example 1 was performed except for injecting 0.5 parts by weight of mineral-based oil B (mineral oil:PDMS=70:30 (weight ratio)) instead of 0.35 parts by weight of the mineral-based oil A (mineral oil:PDMS=80:20 (weight ratio)) during preparing the rubbery polymer latex, in Example 1.

Example 5

The same method as in Example 1 was performed except for injecting mineral-based oil B (mineral oil:PDMS=70:30 (weight ratio)) instead of the mineral-based oil A (mineral oil:PDMS=80:20 (weight ratio)) in the same amount during preparing the rubbery polymer latex, and injecting 3.2 parts by weight of ethyl acrylate instead of 2.8 parts by weight, and injecting 0.8 parts by weight of sodium methylallyl sulfonate instead of 1.2 parts by weight during preparing the graft copolymer latex, in Example 1.

Example 6

The same method as in Example 1 was performed except for injecting mineral-based oil B (mineral oil:PDMS=70:30 (weight ratio)) instead of the mineral-based oil A (mineral oil:PDMS=80:20 (weight ratio)) in the same amount during preparing the rubbery polymer latex, and injecting 2.5 parts by weight of ethyl acrylate instead of 2.8 parts by weight, and injecting 1.5 parts by weight of sodium methylallyl sulfonate instead of 1.2 parts by weight during preparing the graft copolymer latex, in Example 1.

Comparative Example 1

The same method as in Example 1 was performed except for not injecting the mineral-based oil A (mineral oil:PDMS=80:20 (weight ratio)) during preparing the rubbery polymer latex, and injecting 4.0 parts by weight of ethyl acrylate instead of 2.8 parts by weight, and not injecting sodium methylallyl sulfonate during preparing the graft copolymer latex, in Example 1.

Comparative Example 2

The same method as in Example 1 was performed except for injecting mineral-based oil C (mineral oil:PDMS=60:40 (weight ratio)) instead of the mineral-based oil A (mineral oil:PDMS=80:20 (weight ratio)) in the same amount during preparing the rubbery polymer latex, in Example 1.

Comparative Example 3

The same method as in Example 1 was performed except for injecting polydimethylsiolxane (PDMS, viscosity range of 100 cs to 1,000 cs) instead of the mineral-based oil A (mineral oil:PDMS=80:20 (weight ratio)) in the same amount during preparing the rubbery polymer latex, in Example 1.

Comparative Example 4

The same method as in Example 1 was performed except for injecting 0.15 parts by weight of mineral-based oil B (mineral oil:PDMS=70:30 (weight ratio)) instead of 0.35 parts by weight of the mineral-based oil A (mineral oil:PDMS=80:20 (weight ratio)) during preparing the rubbery polymer latex, in Example 1.

Comparative Example 5

The same method as in Example 1 was performed except for injecting 0.55 parts by weight of mineral-based oil B (mineral oil:PDMS=70:30 (weight ratio)) instead of 0.35 parts by weight of the mineral-based oil A (mineral oil:PDMS=80:20 (weight ratio)) during preparing the rubbery polymer latex, in Example 1.

Comparative Example 6

The same method as in Example 1 was performed except for injecting mineral-based oil B (mineral oil:PDMS=70:30 (weight ratio)) instead of the mineral-based oil A (mineral oil:PDMS=80:20 (weight ratio)) in the same amount during preparing the rubbery polymer latex, and injecting 3.5 parts by weight of ethyl acrylate instead of 2.8 parts by weight, and injecting 0.5 parts by weight of sodium methylallyl sulfonate instead of 1.2 parts by weight during preparing the graft copolymer latex, in Example 1.

Comparative Example 7

The same method as in Example 1 was performed except for injecting mineral-based oil B (mineral oil:PDMS=70:30 (weight ratio)) instead of the mineral-based oil A (mineral oil:PDMS=80:20 (weight ratio)) in the same amount during preparing the rubbery polymer latex, and injecting 2.0 parts by weight of ethyl acrylate instead of 2.8 parts by weight, and injecting 2.0 parts by weight of sodium methylallyl sulfonate instead of 1.2 parts by weight during preparing the graft copolymer latex, in Example 1. In this case, when preparing a graft copolymer dry powder, phase separation of a graft copolymer and water was not generated on a latex phase in the graft copolymer latex prepared in Comparative Example 7 due to the increased amount of the sodium methylallyl sulfonate, and a dry powder was not prepared.

Experimental Examples

Experimental Example 1

With respect to the graft copolymers prepared in Examples 1 to 6 and Comparative Examples 1 to 7, the average particle diameters of rubbery polymer particles, and the weight average molecular weights of the graft layers of the graft copolymers were measured by methods below and are shown in Tables 1 and 2.

Figure 1:
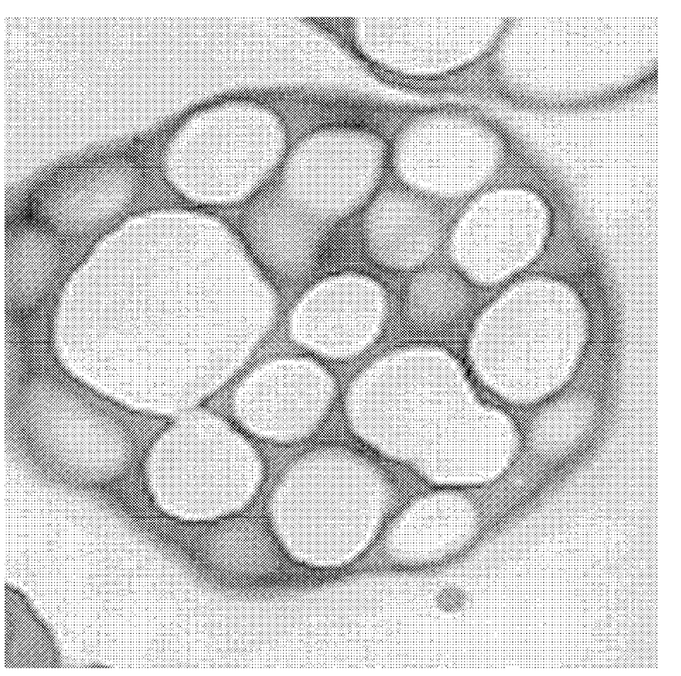
FIG. 1 is a photographic image by transmission electron microscope (TEM) of a rubbery material including a soft domain formed by including a mineral-based oil, in a graft copolymer according to an embodiment of the present invention.

In addition, the picture of the graft copolymer particles prepared in Example 1 was taken by transmission electron microscope (TEM) and shown in FIG. 1. Referring to FIG. 1, it could be confirmed that soft domains were formed in a rubbery polymer for the graft copolymer prepared in Example 1 of the present invention.

* Average particle diameter (D50, nm): each of rubbery polymer latexes prepared in Examples 1 to 6 and Comparative Examples 1 to 7 was diluted in distilled water in a concentration of 200 ppm or less, and an average particle diameter (D50) of rubbery polymer particles dispersed in a rubbery polymer latex was measured according to Intensity Gaussian Distribution using a Dynamic Laser Light Scattering method by using NICOMP 380 (PSS Co.) at room temperature (23° C.)

* Weight average molecular weight (Mw, g/mol): each powder specimen of the graft copolymers prepared in Examples 1 to 6 and Comparative Examples 1 to 7 was dissolved in tetrahydrofuran (THF) into a concentration of 0.25 wt %, and then, loaded on gel permeation chromatography (GPC) and flown. In this case, the columns used were two columns of PLgel Olexis (Polymer laboratories Co.) and one column of PLgel mixed-C (Polymer Laboratories Co.) in combination. In addition, newly replaced columns were all mixed bed type columns, and polystyrene was used as a GPC standard material.

TABLE 1

| | Division | | Example 1 | Example 2 | Example 3 | Example 4 | Example 5 | Example 6 |
|---|---|---|---|---|---|---|---|---|
| Rubbery polymer | BD[1)] | (parts by weight) | 100 | 100 | 100 | 100 | 100 | 100 |
| | MO A[2)] | (parts by weight) | 0.35 | — | — | — | — | — |
| | MO B[3)] | (parts by weight) | — | 0.35 | 0.2 | 0.5 | 0.35 | 0.35 |
| | MO C[4)] | (parts by weight) | — | — | — | — | — | — |
| | PDMS[5)] | (parts by weight) | — | — | — | — | — | — |
| | D50 | (nm) | 200 | 200 | 200 | 200 | 200 | 200 |
| Graft copolymer | Rubbery polymer | (parts by weight) | 70 | 70 | 70 | 70 | 70 | 70 |
| | MMA[6)] | (parts by weight) | 16 | 16 | 16 | 16 | 16 | 16 |
| | EA[7)] | (parts by weight) | 2.8 | 2.8 | 2.8 | 2.8 | 3.2 | 2.5 |
| | SMAS[8)] | (parts by weight) | 1.2 | 1.2 | 1.2 | 1.2 | 0.8 | 1.5 |
| | SM[9)] | (parts by weight) | 10 | 10 | 10 | 10 | 10 | 10 |
| | Mw | (g/mol) | 38,000 | 37,000 | 39,000 | 36,000 | 35,000 | 45,000 |

[1)]BD: 1,3-butadiene
[2)]MO A: mineral-based oil A (mineral oil:PDMS = 80:20 (weight ratio))
[3)]MO B: mineral-based oil B (mineral oil:PDMS = 70:30 (weight ratio))
[4)]MO C: mineral-based oil C (mineral oil:PDMS = 60:40 (weight ratio))
[5)]PDMS: polydimethylsiloxane
[6)]MMA: methyl methacrylate
[7)]EA: ethyl acrylate
[8)]SMAS: sodium methylallyl sulfonate
[9)]SM: styrene

TABLE 2

| | Division | | Comparative Example 1 | 2 | 3 | 4 | 5 | 6 | 7 |
|---|---|---|---|---|---|---|---|---|---|
| Rubbery polymer | BD[1)] | (parts by weight) | 100 | 100 | 100 | 100 | 100 | 100 | 100 |
| | MO A[2)] | (parts by weight) | — | — | — | — | — | — | — |
| | MO B[3)] | (parts by weight) | — | — | — | 0.15 | 0.55 | 0.35 | 0.35 |
| | MO C[4)] | (parts by weight) | — | 0.35 | — | — | — | — | — |
| | PDMS[5)] | (parts by weight) | — | — | 0.35 | — | — | — | — |
| | D50 | (nm) | 200 | 200 | 200 | 200 | 200 | 200 | 200 |
| Graft copolymer | Rubbery polymer | (parts by weight) | 70 | 70 | 70 | 70 | 70 | 70 | 70 |
| | MMA[6)] | (parts by weight) | 16 | 16 | 16 | 16 | 16 | 16 | 16 |
| | EA[7)] | (parts by weight) | 4.0 | 2.8 | 2.8 | 2.8 | 2.8 | 3.5 | 2.0 |
| | SMAS[8)] | (parts by weight) | — | 1.2 | 1.2 | 1.2 | 1.2 | 0.5 | 2.0 |
| | SM[9)] | (parts by weight) | 10 | 10 | 10 | 10 | 10 | 10 | 10 |

TABLE 2-continued

| | | Comparative Example | | | | | | |
|---|---|---|---|---|---|---|---|---|
| Division | | 1 | 2 | 3 | 4 | 5 | 6 | 7 |
| Mw | (g/mol) | 25,000 | 36,500 | 37,000 | 36,000 | 37,000 | 30,000 | Not measurable |

[1)]BD: 1,3-butadiene
[2)]MO A: mineral-based oil A (mineral oil:PDMS = 80:20 (weight ratio))
[3)]MO B: mineral-based oil B (mineral oil:PDMS = 70:30 (weight ratio))
[4)]MO C: mineral-based oil C (mineral oil:PDMS = 60:40 (weight ratio))
[5)]PDMS: polydimethylsiloxane
[6)]MMA: methyl methacrylate
[7)]EA: ethyl acrylate
[8)]SMAS: sodium methylallyl sulfonate
[9)]SM: styrene Experimental Example 2

100 parts by weight of a vinyl chloride resin (LG Chem, Ltd., product name: 080S), 1.50 parts by weight of a thermal stabilizer (tin stearate), 1.0 part by weight of an internal lubricant (potassium stearate), 0.3 parts by weight of an external lubricant (paraffin wax), 0.5 parts by weight of a processing aid (LG Chem, Ltd., product name: PA-910), and 0.5 parts by weight of a pigment were sufficiently mixed at a temperature of 130° C. using a high-speed stirrer, and cooled to prepare a vinyl chloride resin master batch. To the vinyl chloride resin master batch thus prepared, 7 parts by weight of each of the graft copolymer dry powders prepared in Examples 1 to 6 and Comparative Examples 1 to 6 were injected, and processed using a roll of 195° C. for 5 minutes to form a specimen having a thickness of 0.5 mm. Impact strength, whitening properties and processability (non-dispersion melting properties) were evaluated by methods below and are shown in Tables 3 and 4 below.

* Impact strength (rotary impact strength, %): the specimen thus formed was cut into a size of 3 cm (length)×14 cm (width), and 1 set of a rotary test specimen was formed with 16 pieces. By using a rotary impact strength tester, impact was applied to each specimen while rotating at high speed of 950 rpm to 1,050 rpm for 30 seconds at room temperature (23±3° C.), and according to the status, the specimens were classified into five grades as below, and according to the average of scores according to the grade classified in the 1 set of the specimen, impact efficiency was calculated. Higher calculated impact efficiency means excellent impact strength, and 50% or more means very excellent.

Grade A (100 points): no breakage and crack (100% preserved)
Grade B (75 points): no breakage but generation of crack
Grade C (50 points): generation of breakage and crack (greater than 50% preserved)
Grade D (25 points): generation of breakage and crack (50% or less preserved)
Grade E (0 points): generation of breakage and crack (not preserved)

* Whitening properties (Haze, %): with respect to the specimens formed, Haze was measured using a Haze meter HZ-V3 apparatus based on an evaluation method of ASTM D-1003. The lower Haze means better whitening properties.

* Processability (non-dispersion melting properties, five-point method): 8 g of each of the graft copolymer specimens prepared in Examples 1 to 6 and Comparative Examples 1 to 6 was injected to 100 g of a vinyl chloride resin including a plasticizer (DOP50) and mixed, and then, processed using a roll of 175° C. for 90 seconds to form a specimen having 15 cm (length)×15 cm (width)×0.4 mm (thickness). The number of fish-eyes in the specimen formed was checked, and the score was shown by a five-point method based on the standard below.

5 points: 0 to 5 bumps
4.5 points: 6 to 10 bumps
4 points: 11 to 20 bumps
3 points: 21 to 30 bumps
2 points: 31 to 40 bumps
1 point: 41 to 50 bumps

TABLE 3

| | | | Example | | | | | |
|---|---|---|---|---|---|---|---|---|
| Division | | | 1 | 2 | 3 | 4 | 5 | 6 |
| Impact strength | Rotary impact efficiency | (%) | 62 | 60 | 57 | 65 | 59 | 65 |
| Whitening properties | Haze | (%) | 79 | 78 | 77 | 78 | 79 | 81 |
| Processability | Fish-eye | (5-point method) | 5 | 5 | 5 | 5 | 5 | 5 |

TABLE 4

| | | | Comparative Example | | | | | | |
|---|---|---|---|---|---|---|---|---|---|
| Division | | | 1 | 2 | 3 | 4 | 5 | 6 | 7 |
| Impact strength | Rotary impact efficiency | (%) | 50 | 61 | 64 | 51 | 67 | 54 | Not measurable |
| Whitening properties | Haze | (%) | 81 | 92 | 94 | 80 | 91 | 80 | Not measurable |
| Processability | Fish-eye | (5-point method) | 4 | 5 | 5 | 5 | 5 | 4.5 | Not measurable |

As shown in Tables 3 and 4 above, it could be confirmed that the resin composition including the graft copolymer prepared according to the present invention as an impact reinforcing agent, prevented the degradation of whitening properties or improved thereof, and showed excellent dispersibility and processability. Particularly, a soft domain was stably formed from the mineral-based oil in the rubbery polymer, and the weight average molecular weight of the graft layer of the graft copolymer could be increased due to the ionic bonds through sodium methylallyl sulfonate during preparing the graft copolymer, and accordingly, the entanglement between the vinyl chloride resin and the graft copolymer was reinforced, energy from external stress was reduced, and impact strength was improved.

On the contrary, in case of Comparative Example 1 in which the mineral-based oil was not injected during preparing the rubbery polymer, and the sodium methylallyl sulfonate was not injected during preparing the graft copolymer, it could be confirmed that processability was deteriorated, and impact strength was inferior.

In addition, in case of Comparative Example 2 in which the mineral-based oil was applied, but the PDMS content was high, and in case of Comparative Example 3 in which PDMS which is a silicone-based oil was applied instead of a mineral-based oil, it could be confirmed that whitening properties were extremely poor, and from this, it could be confirmed that a silicone-based oil such as PDMS induced whitening properties with respect to a vinyl chloride resin.

In addition, in case of Comparative Example 4 in which a mineral-based oil was applied, but its content was insufficient, it could be confirmed that a soft domain was insufficiently formed in the rubbery polymer, and impact strength was reduced. In case of Comparative Example 5 in which a mineral-based oil was applied, but its content was excessive, the absolute amount of PDMS was increased, and it could be confirmed that whitening properties were extremely poor as in Comparative Examples 2 and 3.

In addition, in case of Comparative Example 6 in which sodium methylallyl sulfonate was applied but in an insufficient amount, the weight average molecular weight of the graft layer of a graft copolymer was insufficiently high, and it could be confirmed that the graft layer was insufficiently formed, and impact strength was reduced as well as processability. In case of Comparative Example 7 in which sodium methylallyl sulfonate was applied but in an excessive amount, the phase separation of the graft copolymer and water on a latex was not generated due to the increased amount of the sodium methylallyl sulfonate during preparing the graft copolymer dry powder, and a dry powder could not be prepared, and a specimen could not be formed, either.

From the results described above, it could be confirmed that in case of applying the graft copolymer according to the present invention as an impact reinforcing agent in a vinyl chloride-based resin, excellent effects of the impact resistance of a resin composition may be achieved, while maintaining the whitening properties to equal or better levels, and it could be confirmed that effects of reinforcing entanglement between the vinyl chloride resin and the graft copolymer, reducing energy from external stress, and minimizing the deformation of a molded article may be achieved.

The invention claimed is:

1. A graft copolymer comprising a rubbery polymer, wherein the rubbery polymer comprises a conjugated diene-based monomer unit, and a soft domain, the graft copolymer comprises an alkyl (meth)acrylate-based monomer unit, an aromatic vinyl-based monomer unit, and an alkali metal sulfonate-based monomer unit, the soft domain is formed by comprising a mineral-based oil, the mineral-based oil comprises 70 wt % to 100 wt % of a mineral oil and 0 wt % to 30 wt % of a silicone-based oil, the mineral-based oil is comprised in 0.2 parts by weight to 0.5 parts by weight based on 100 parts by weight of the rubbery polymer, and the alkali metal sulfonate-based monomer unit is comprised in 0.8 wt % to 1.5 wt % based on the graft copolymer.

2. The graft copolymer according to claim 1, wherein the rubbery polymer comprises an aromatic vinyl-based monomer unit.

3. The graft copolymer according to claim 1, wherein the mineral-based oil is comprised in 0.3 parts by weight to 0.4 parts by weight based on 100 parts by weight of the rubbery polymer.

4. The graft copolymer according to claim 1, wherein the mineral-based oil comprises 70 wt % to 80 wt % of the mineral oil and 20 wt % to 30 wt % of the silicone-based oil.

5. The graft copolymer according to claim 1, wherein the alkyl (meth)acrylate-based monomer unit comprises one or more monomer units selected from the group consisting of: a methyl (meth)acrylate monomer unit; and an alkyl (meth)acrylate monomer of 2 to 12 carbon atoms.

6. The graft copolymer according to claim 1, wherein the alkali metal sulfonate-based monomer is sodium methylallyl sulfonate.

7. The graft copolymer according to claim 1, wherein the graft copolymer comprises a graft layer comprising the alkyl (meth)acrylate-based monomer unit, the aromatic vinyl-based monomer unit and the alkali metal sulfonate-based monomer unit, which are grafted into the rubbery polymer.

8. The graft copolymer according to claim 7, wherein the graft layer has a weight average molecular weight of 35,000 g/mol to 45,000 g/mol.

9. A method for preparing a graft copolymer, the method comprising:
injecting and polymerizing a conjugated diene-based monomer and a mineral-based oil to prepare a rubbery polymer latex comprising a rubbery polymer (S10);
injecting an alkyl (meth)acrylate-based monomer and an alkali metal sulfonate-based monomer in the presence of the rubbery polymer latex prepared in step (S10), and graft polymerizing to prepare a graft copolymer latex comprising a graft copolymer (S20); and
injecting an aromatic vinyl-based monomer in the presence of the graft copolymer latex prepared in step (S20) and secondly graft polymerizing (S30),
wherein the mineral-based oil comprises 70 wt % to 100 wt % of a mineral oil and 0 wt % to 30 wt % of a silicone-based oil,
the mineral-based oil is injected in 0.2 parts by weight to 0.5 parts by weight based on 100 parts by weight of the conjugated diene-based monomer, and
the alkali metal sulfonate-based monomer is injected in 0.8 wt % to 1.5 wt % based on the rubbery polymer and a total monomer amount injected.

10. A resin composition comprising the graft copolymer according to any one among claims 1 to 8, and a vinyl chloride-based resin.

* * * * *